(12) United States Patent
Choi et al.

(10) Patent No.: US 11,374,641 B2
(45) Date of Patent: Jun. 28, 2022

(54) GROUPING DEVICES TO REDUCE LATENCY IN ROUND TRIP TIME BASED MILLIMETER WAVE POSITIONING

(71) Applicant: QUALCOMM Incorporated, San Diego, CA (US)

(72) Inventors: Chang-Sik Choi, Hillsborough, NJ (US); Shuanshuan Wu, San Diego, CA (US); Kapil Gulati, Belle Mead, NJ (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 17/061,280

(22) Filed: Oct. 1, 2020

(65) Prior Publication Data

US 2022/0109484 A1   Apr. 7, 2022

(51) Int. Cl.
*H04B 7/06* (2006.01)
*H04B 7/0408* (2017.01)
*H04W 74/08* (2009.01)

(52) U.S. Cl.
CPC ......... *H04B 7/0695* (2013.01); *H04B 7/0408* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 9,135,208 B1* | 9/2015 | Huang | G06F 15/16 |
| 2011/0282989 A1* | 11/2011 | Geirhofer | H04W 72/0493 |
| | | | 709/227 |
| 2013/0294405 A1* | 11/2013 | Radulescu | H04W 36/34 |
| | | | 370/331 |
| 2019/0238345 A1* | 8/2019 | Gage | H04L 9/0833 |
| 2020/0211376 A1* | 7/2020 | Roka | G06F 9/54 |
| 2021/0152647 A1* | 5/2021 | Singh | G06N 3/006 |

* cited by examiner

*Primary Examiner* — Harry H Kim
(74) *Attorney, Agent, or Firm* — Patterson & Sheridan, LLP

(57) ABSTRACT

Certain aspects of the present disclosure provide techniques for grouping devices to reduce latency in round trip time based millimeter wave positioning. A method that may be performed by a wireless device includes obtaining a status, of the wireless device, within a group including the wireless device, wherein the group comprises a group owner (GO) of the group and one or more members of the group; and participating in a positioning procedure that estimates a position of at least one of the GO or the one or more members according to the status of the wireless device.

26 Claims, 9 Drawing Sheets

800

┌─ 802

OBTAIN A STATUS, OF THE WIRELESS DEVICE, WITHIN A GROUP INCLUDING THE WIRELESS DEVICE, WHEREIN THE GROUP COMPRISES A GROUP OWNER (GO) OF THE GROUP AND ONE OR MORE MEMBERS OF THE GROUP

┌─ 804

PARTICIPATE IN A POSITIONING PROCEDURE THAT ESTIMATES A POSITION OF AT LEAST ONE OF THE GO OR THE ONE OR MORE MEMBERS ACCORDING TO THE STATUS OF THE WIRELESS DEVICE

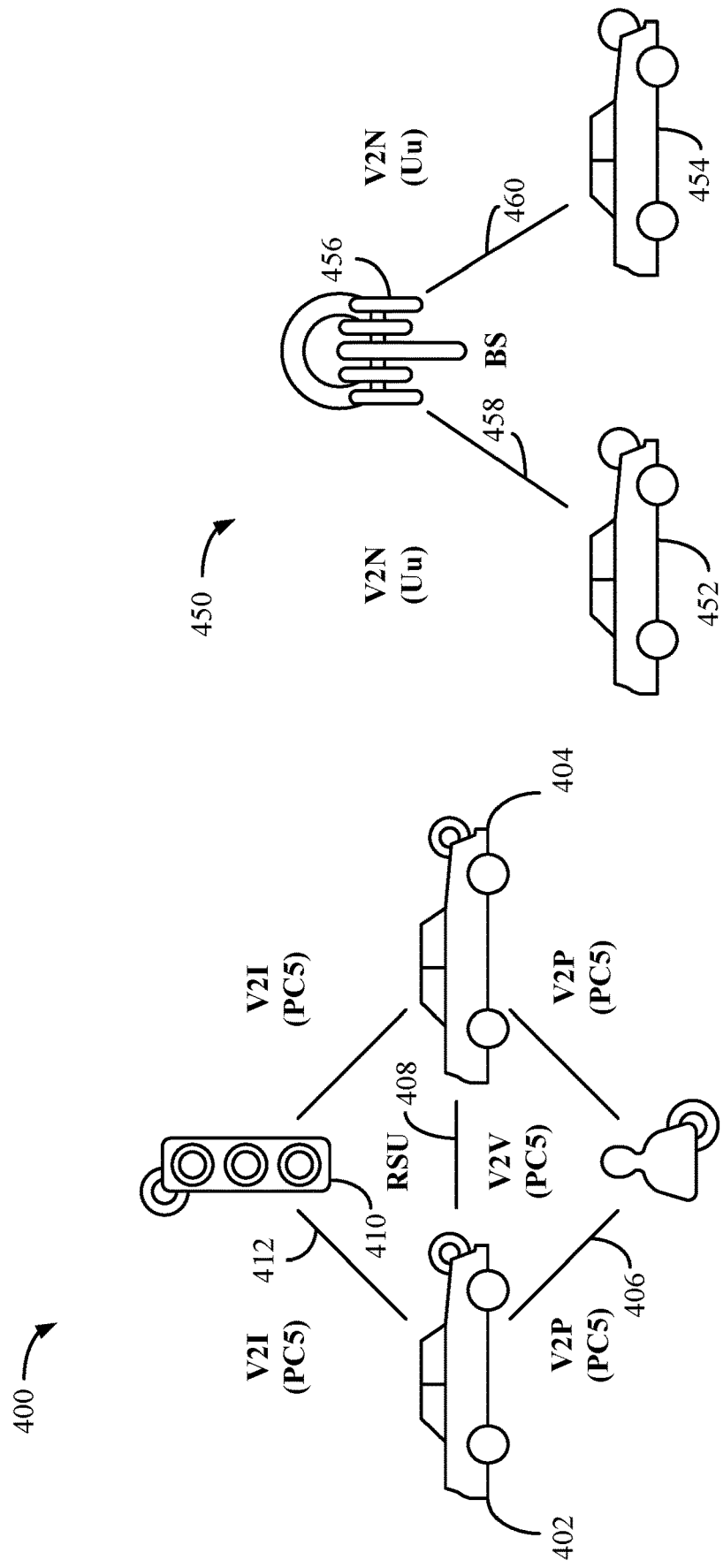

GROUPING DEVICES TO REDUCE LATENCY IN ROUND TRIP TIME BASED MILLIMETER WAVE POSITIONING

BACKGROUND

Field of the Disclosure

Aspects of the present disclosure relate to wireless communications, and more particularly, to techniques for grouping devices to improve latency in round trip time (RTT) based millimeter wave (mmWave) positioning.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved accuracy and reduced latency in positioning of UEs (e.g., UEs in vehicles).

Certain aspects of the subject matter described in this disclosure can be implemented in a method for wireless communication by a wireless device. The method generally includes obtaining a status, of the wireless device, within a group including the wireless device, wherein the group comprises a group owner (GO) of the group and one or more members of the group; and participating in a positioning procedure that estimates a position of at least one of the GO or the one or more members according to the status of the wireless device.

Certain aspects of the subject matter described in this disclosure can be implemented in an apparatus for wireless communication. The apparatus generally includes: at least one processor configured to: obtain a status, of the apparatus, within a group including the apparatus, wherein the group comprises a group owner (GO) of the group and one or more members of the group; and participate in a positioning procedure that estimates a position of at least one of the GO or the one or more members according to the status of the apparatus; and a memory coupled with the at least one processor.

Certain aspects of the subject matter described in this disclosure can be implemented in an apparatus for wireless communication. The apparatus generally includes: means for obtaining a status, of the apparatus, within a group including the apparatus, wherein the group comprises a group owner (GO) of the group and one or more members of the group; and means for participating in a positioning procedure that estimates a position of at least one of the GO or the one or more members according to the status of the apparatus.

Certain aspects of the subject matter described in this disclosure can be implemented in a computer-readable medium for wireless communications including instructions that, when executed by a processing system in a wireless device, cause the processing system to perform operations including: obtaining a status, of the wireless device, within a group including the wireless device, wherein the group comprises a group owner (GO) of the group and one or more members of the group; and participating in a positioning procedure that estimates a position of at least one of the GO or the one or more members according to the status of the wireless device.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 4A-B show diagrammatic representations of example vehicle to everything (V2X) systems, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
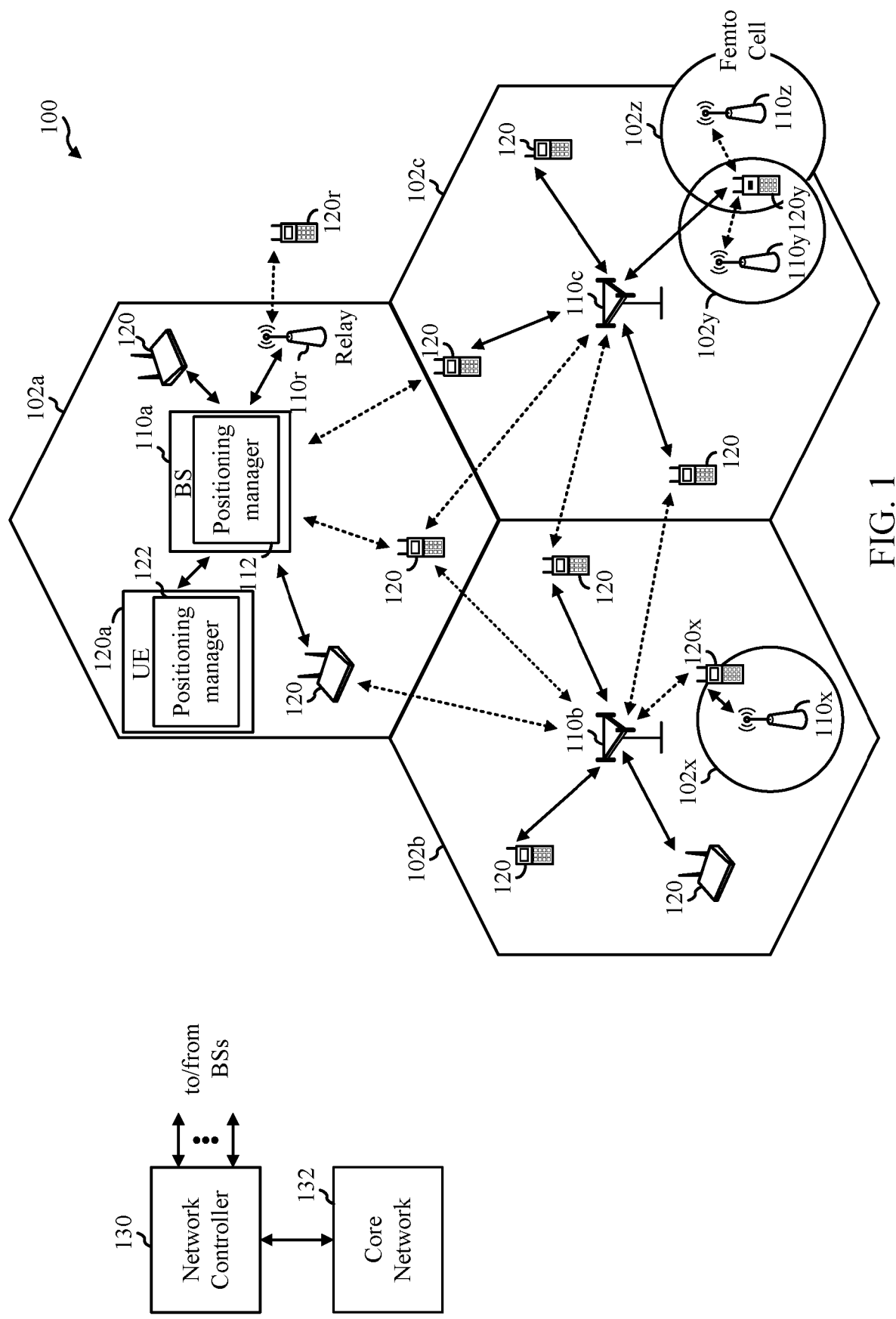
FIG. 1 is a block diagram conceptually illustrating an example wireless communication network, in accordance with certain aspects of the present disclosure.

Aspects of the present disclosure provide apparatus, methods, processing systems, and computer readable mediums for grouping devices to improve latency in round trip time (RTT) based millimeter wave (mmWave) positioning. In aspects of the present disclosure, wireless devices (e.g., UEs in vehicle and roadside service units (RSUs)) may perform positioning (e.g., exchanging signaling to determine each device's position) in unlicensed spectrum. For unlicensed spectrum operation, devices may be required to perform a listen before talk (LBT) operation. In aspects of the present disclosure, RSUs and UEs (e.g., in vehicles or on pedestrians) may perform a group LBT in which an initiator announces a channel occupancy time (COT) in the unlicensed spectrum for itself and its responders (e.g., other members of the group).

In a millimeter wave (mmWave) communication system performing positioning, there might be many beams from RSUs, vehicles, and/or pedestrians, so that the total duration of PRS transmission may be very high (e.g., due to each device transmitting a PRS on each beam). This may affect the latency and the accuracy (e.g., due to accumulated clock drift due to the increased timing between, e.g., an RSU PRS and a vehicle PRS) of the positioning system.

According to aspects of the present disclosure, techniques are provided for grouping wireless devices to reduce a number of beams on which PRS are transmitted. Reducing the number of beams on which PRS are transmitted may reduce the latency and increase the accuracy of a positioning system.

The following description provides examples of improving positioning using low latency signaling in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

According to certain aspects, the BSs 110 and UEs 120 may be configured for improving positioning using low latency signaling. As shown in FIG. 1, the BS 110a includes a positioning manager 112 that obtains a status, of the BS, within a group including the BS, wherein the group comprises a group owner (GO, which may be the BS) of the group and one or more members of the group; and participates in a positioning procedure that estimates a position of at least one of the GO or the one or more members according to the status of the BS, in accordance with aspects of the present disclosure. The UE 120a includes a positioning manager 122 that obtains a status, of the UE, within a group including the UE, wherein the group comprises a group owner (GO) of the group and one or more members of the group; and participates in a positioning procedure that estimates a position of at least one of the GO or the one or more members according to the status of the UE, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
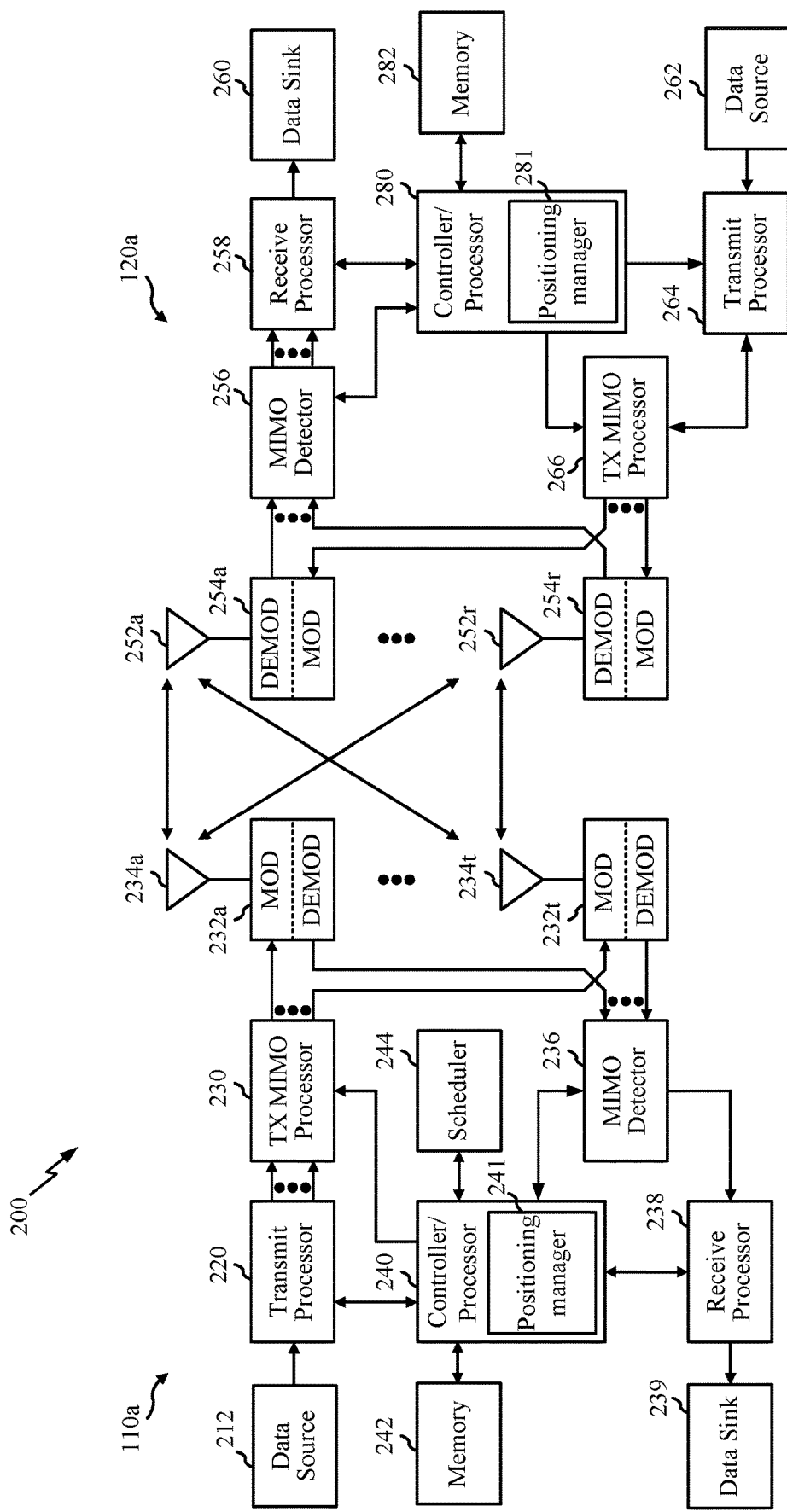
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a positioning manager 241 that obtains a status, of the BS, within a group including the BS, wherein the group comprises a group owner (GO, which may be the BS) of the group and one or more members of the group; and participates in a positioning procedure that estimates a position of at least one of the GO or the one or more members according to the status of the BS, according to aspects described herein. As shown in FIG. 2, the controller/processor 280 of the UE 120a has a positioning manager 281 that obtains a status, of the UE, within a group including the UE, wherein the group comprises a group owner (GO) of the group and one or more members of the group; and participates in a positioning procedure that estimates a position of at least one of the GO or the one or more members according to the status of the UE, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
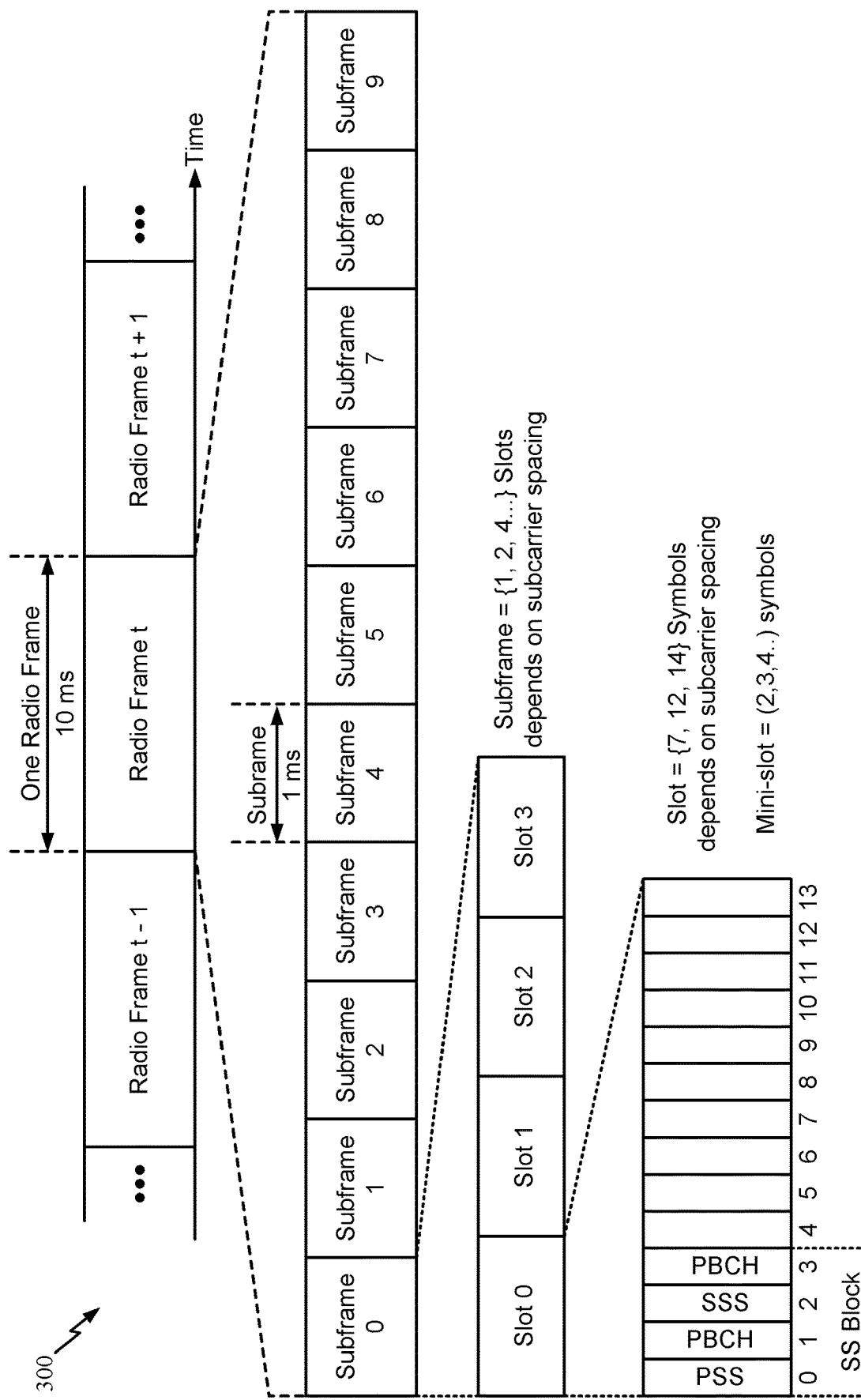
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

FIG. 4A and FIG. 4B show diagrammatic representations of example V2X systems, in accordance with some aspects of the present disclosure. For example, the vehicles shown in FIG. 4A and FIG. 4B may communicate via sidelink channels and may perform sidelink CSI reporting as described herein.

The V2X systems, provided in FIG. 4A and FIG. 4B provide two complementary transmission modes. A first transmission mode, shown by way of example in FIG. 4A, involves direct communications (for example, also referred to as sidelink communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, roadside service unit 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. The network communications through vehicle to network (V2N) links 458 and 460 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may also be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Aspects of the disclosure relate to sidelink communications, such as cellular-vehicular-to-anything (C-V2X) communications. C-V2X can offer vehicles low-latency V2V, V2I, and V2P communication. C-V2X networks can operate without cellular infrastructure support. For example, C-V2X communication allows direct communication between two UE devices, without transmissions through the BS, functioning by continuous monitoring and decoding of other UE devices. In C-V2X, vehicles can autonomously select their radio resources. For example, the vehicles may select resources, such as semi-persistent scheduling (SPS) resources, according to an algorithm. The algorithm may be a resource allocation algorithm specified by the 3GPP wireless standards.

Current 3GPP C-V2X design targets deployment in a licensed spectrum, either by deployment in a shared, licensed cellular band or by deployment in a dedicated intelligent transportation system (ITS) spectrum. In the licensed spectrum, the spectrum may be assigned exclusively to operators for independent usage. Licensed spectrum may either be shared or dedicated. Shared licensed spectrums provide bandwidth up to a specified level and the bandwidth is shared among all subscribers. Therefore, in a licensed cellular band, a C-V2X system shares uplink spectrum in the cellular network. On the other hand, dedicated internet spectrum provides guaranteed bandwidth at all times, thereby providing spectrum exclusivity when the C-V2X design is deployed in a dedicated ITS spectrum.

According to aspects of the present disclosure, sidelink positioning may include transmitting, receiving, and measuring positioning reference signals (PRSs) to and from RSUs and a vehicle.

In aspects of the present disclosure, sidelink positioning may further include roundtrip time (RTT) based positioning using PRSs on unlicensed spectrum.

According to aspects of the present disclosure, positioning may include exchanging messages other than PRS between members of a group. In a first phase of an example positioning procedure, RSUs and/or vehicle(s) (e.g., devices in a group) transmit pre-PRS messages that are mostly used for grouping (that is, determining to which group each device belongs) and exchanging PRS identifier (ID) indices with each other (e.g., so each device can identify each PRS that they receive). In a second phase of the example positioning procedure, RSUs and vehicle(s) transmit PRSs sequentially. In a third phase of the example positioning procedure, the devices exchange ITS messages conveying the time of departure of each PRS (e.g., time 542 for the PRS 504 from RSU 502 described below with reference to FIGS. 5A-C) and time of arrival of each PRS (e.g., time 548 for the PRS 532 from the vehicle 530 described below with reference to FIGS. 5A-C). Similarly, the time of arrival of each PRS (e.g., the time that the PRS 504 arrived at the vehicle 530) and the time of departure of each PRS (e.g., the time that the vehicle transmitted the PRS 532) are exchanged.

In aspects of the present disclosure, using intelligent transportation system (ITS) messaging in V2X spectrum, RSUs and vehicle may be grouped. The RSUs and vehicle in the group may perform group listen before talk (LBT), wherein an initiator (e.g., one of the RSUs) reserves time slots for PRS transmissions by members of the group.

According to aspects of the present disclosure, PRSs may be broadcast sequentially, with each RSU in the group transmitting a PRS, and then the vehicle transmitting a PRS. The time of arrival (ToA) of PRSs may then be exchanged using ITS messaging in V2X spectrum.

In aspects of the present disclosure, a vehicle may estimate a location of the vehicle and clock error, based on the ToA and using, for example, a Kalman filter.

Figure 5C:
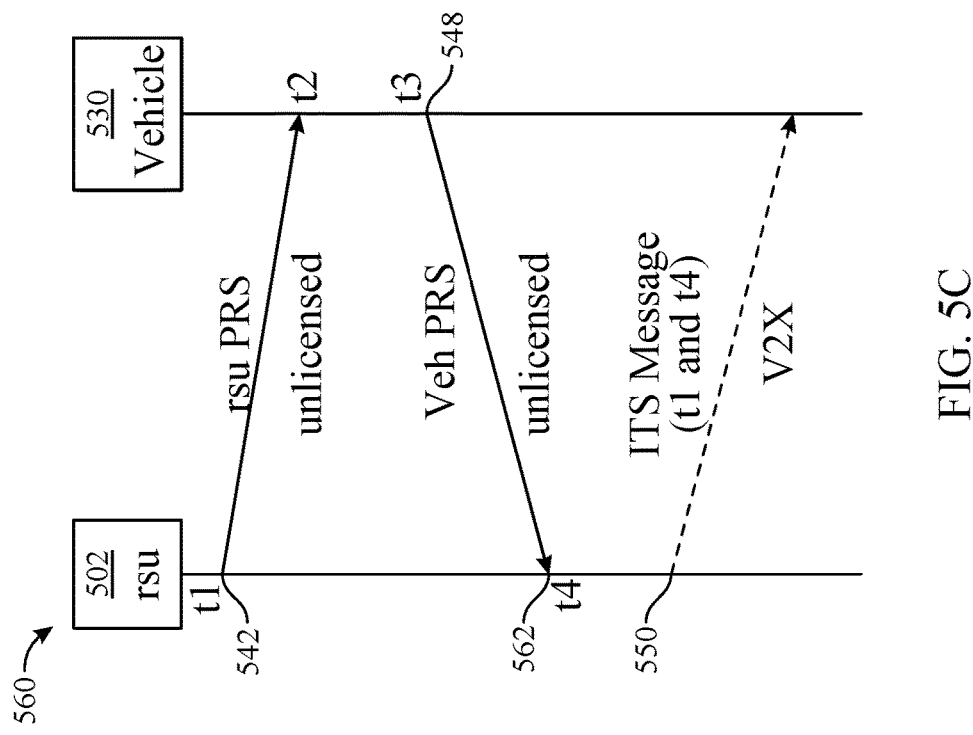
FIGS. 5A-C are schematic illustrations of roadside service units (RSUs) and a vehicle performing positioning, in accordance with certain aspects of the present disclosure.
Figure 5A:
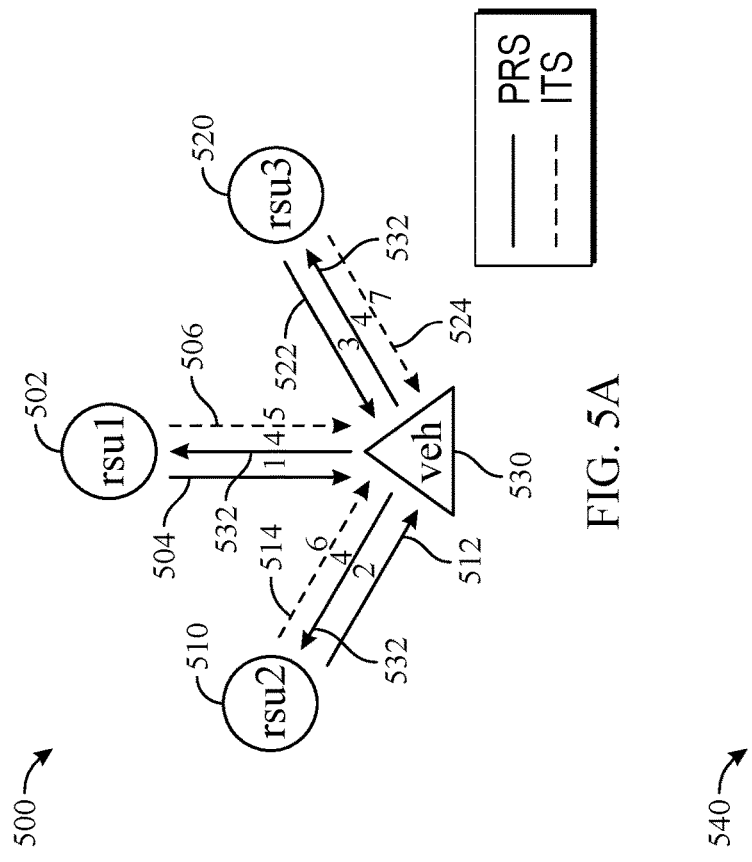
Figure 5B:
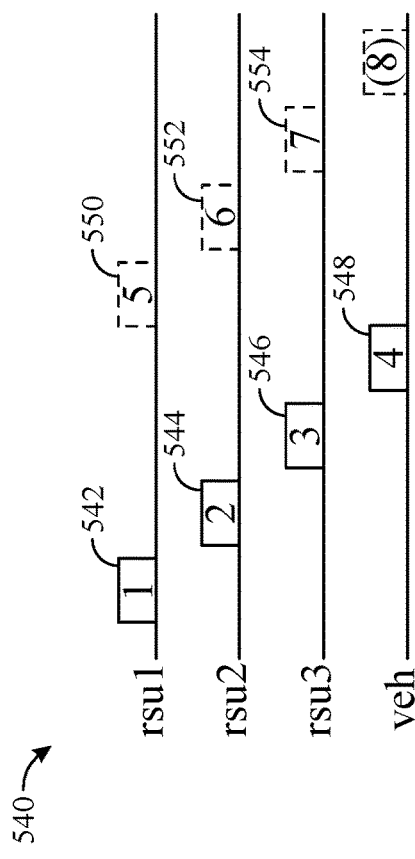

FIGS. 5A-C are schematic illustrations 500, 540, and 560 of RSUs 502, 510, and 520 and vehicle 530 performing positioning, in accordance with aspects of the present disclosure. FIG. 5B schematically illustrates the timeline 540 of the various transmissions. FIG. 5C schematically illustrates the timeline 560 of transmissions between RSU 502 and the vehicle. Referring to FIG. 5A, RSU 502 transmits a first PRS 504 at a time 542 (see FIG. 5B). RSU 510 transmits a second PRS 512 at time 544. Similarly, RSU 520 transmits a third PRS 522 at time 546. The vehicle transmits a fourth PRS 532 (which is received by each of RSU 502, 510, and 520) at time 548. The RSU 502 transmits a first ITS message 506 at time 550 that indicates the time 542 at which the RSU 502 transmitted the PRS 504 and the time 562 (see FIG. 5C) when the RSU 502 received the fourth PRS 532 from the vehicle. Similarly, the RSU 510 transmits a second ITS message 514 at time 552 that indicates the time at which the RSU 510 transmitted the second PRS 512 and the time at which the RSU 510 received the fourth PRS 532 from the vehicle. The RSU 520 transmits a third ITS message 524 at time 554 that indicates the time at which the RSU 520 transmitted the third PRS 522 and the time at which the RSU 520 received the fourth PRS 532 from the vehicle. As mentioned above, each of the time slots 542, 544, 546, 548, 550, 552, and 554 may have been reserved via a group LBT process.

According to aspects of the present disclosure, in order to estimate its location, a vehicle (e.g., vehicle 530 in FIG. 5A) also needs to estimate its clock error from RTT.

In aspects of the present disclosure, the vehicle may be able to resolve this joint estimation (i.e., estimating the vehicle's location and clock error) when the angular change in PRS is large enough over the trajectory of estimation.

As previously described herein, in a millimeter wave (mmWave) communication system performing positioning, there might be many beams from RSUs, vehicles, and/or pedestrians, so that the total duration of PRS transmission may be very high (e.g., due to each device transmitting a PRS on each beam). This may affect the latency and the accuracy (e.g., due to accumulated clock drift due to the increased timing between, e.g., an RSU PRS and a vehicle PRS) of the positioning system.

Accordingly, it is desirable to develop techniques for grouping wireless devices to reduce a number of beams on which PRS are transmitted.

Example Grouping Devices to Reduce Latency in Round Trip Time Based Millimeter Wave Positioning Aspects of the present disclosure provide techniques for grouping wireless devices to reduce a number of beams on which PRS are transmitted. Reducing the number of beams on which PRS are transmitted may reduce the latency and increase the accuracy of a positioning system.

In aspects of the present disclosure, devices performing positioning may be classified as positioning anchors when those devices know their locations accurately or as positioning non-anchors when those devices do not know their locations accurately.

According to aspects of the present disclosure, a group of devices performing positioning may perform a group LBT procedure and a group owner (GO) of the group may reserve a long channel occupancy time for the positioning procedure.

Figure 6:
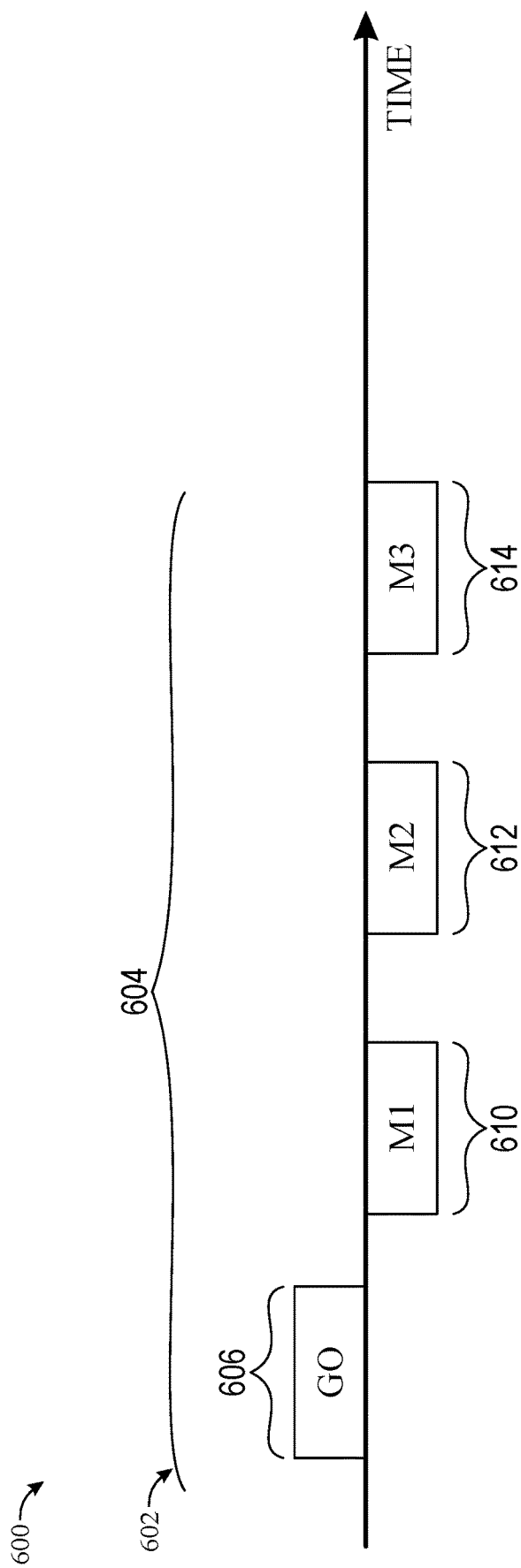
FIG. 6 is an exemplary transmission timeline of a group of devices performing positioning, in accordance with certain aspects of the present disclosure.

FIG. 6 is an exemplary transmission timeline 600 of a group of devices performing positioning, in accordance with aspects of the present disclosure. At 602, the group owner (GO) announces a channel occupancy time 604 (e.g., after completing an LBT procedure, not shown) for the unlicensed spectrum. During the period 606, the GO transmits PRSs using each beam available to the GO (e.g., each beam of the GO that is directed to another member of the group). During each of the periods 610, 612, and 614, a member of the group transmits one or more PRSs using a beam directed to the GO and/or another member of the group. Different members may transmit PRSs during each of the periods 610, 612, and 614. Additionally or alternatively, a member may transmit PRSs using different beams during each of the periods 610, 612, and 614. While the exemplary transmission timeline shows three periods 610, 612, and 614 for PRS transmissions by members of the group other than the GO, the present disclosure is not so limited, and more or fewer periods may be used for PRS transmissions by a member of the group other than the GO.

According to aspects of the present disclosure, during group formation for performing positioning RSUs having known locations may be classified as positioning anchors.

In aspects of the present disclosure, stationary vehicles parked at known locations may be classified as positioning anchors.

According to aspects of the present disclosure, moving vehicles that can estimate their location with high confidence be classified as positioning anchors. In such aspects, the moving vehicles that can estimate their location with high confidence may be determined based on variance of the location estimates of those vehicles.

In aspects of the present disclosure, moving vehicles that lack a previous estimate of their location and do not have access to data from a global navigation satellite system (GNSS, e.g., the Global Positioning System (GPS)) may be classified as positioning non-anchors.

According to aspects of the present disclosure, pedestrians that do not have access to data from a GNSS may be classified as positioning non-anchors.

In aspects of the present disclosure, characterization (e.g., as a positioning anchor or positioning non-anchor) of a device may be indicated early in a positioning procedure by an ITS broadcast message. The ITS broadcast message(s) may announce formation of a group.

According to aspects of the present disclosure, when a group is formulated, positioning anchors may preferably be selected to be group owners, and positioning non-anchors may be preferably selected to be group members.

In aspects of the present disclosure, a group may include multiple positioning anchors, and the group owner of the group may be one of the positioning anchors.

According to aspects of the present disclosure, once a group is formed, positioning anchors within the group may transmit PRSs using all beams available (e.g., directed to another member of the group) to the positioning anchors.

In aspects of the present disclosure, once groups are formed, non-anchors will use up to k beam available to them According to aspects of the present disclosure, for performing an LBT procedure before performing a positioning procedure, length of the channel occupancy time resulting from the LBT procedure may be estimated as (number of positioning anchors)*(number of beams for each positioning anchor)+(number of positioning non-anchors)*(k), where k is a constant.

In aspects of the present disclosure, the value of k may be set to be less than a total number of beams available to any of the positioning non-anchors in the group. For example, in a group performing positioning, k may be determined to be 2.

According to aspects of the present disclosure, setting k to be less than a total number of beams available to any of the positioning non-anchors may enable a positioning procedure to take a shorter period of time than a positioning procedure in which positioning non-anchors transmit PRSs on every beam available to the positioning non-anchors. In aspects of the present disclosure, a COT for performing positioning in unlicensed spectrum may be shorter when positioning non-anchors do not transmit on every beam available to the positioning non-anchors.

In aspects of the present disclosure, setting k to be less than a total number of beams available to any of the positioning non-anchors may reduce a period between reception of PRSs from positioning anchors and transmission of PRSs from positioning non-anchors.

According to aspects of the present disclosure, as size of a group increases, the period between reception of PRSs from positioning anchors and transmission of PRSs from positioning non-anchors (e.g., the period t3-t2 in FIG. 5C) may be bounded by (k)*(number of members), so that clock error drift accumulated over that period may also be bounded.

Figure 7:
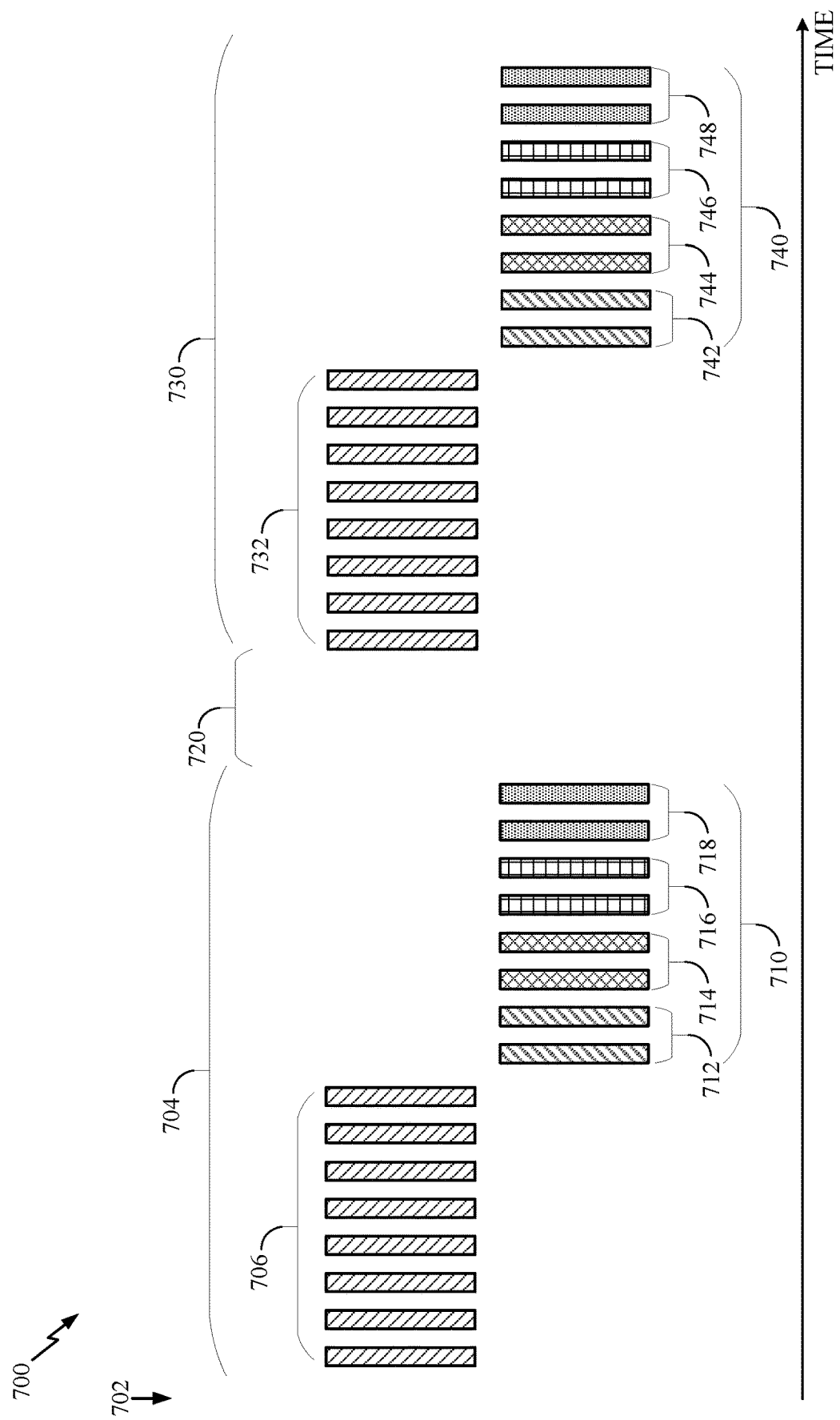
FIG. 7 is an exemplary transmission timeline of a group of devices performing positioning, in accordance with certain aspects of the present disclosure.

FIG. 7 is an exemplary transmission timeline 700 of a group of devices performing positioning, in accordance with aspects of the present disclosure. The exemplary transmission timeline is for a group of devices including a group owner (e.g., BS 110 shown in FIGS. 1-2; RSU 410 shown in FIG. 4A; network entity 456 shown in FIG. 4B; or RSUs 502, 510, and 520 shown in FIG. 5A) and four member devices (e.g., UE 120 shown in FIGS. 1-2; vehicles 402, 404, 452, and 454 in FIGS. 4A-B; or vehicle 530 shown in FIG. 5A). In the exemplary transmission timeline, k=2. At 702, the GO announces a channel occupancy time (e.g., after completing an LBT procedure, not shown) for the unlicensed spectrum. The COT may be, for example, 8 ms. A first PRS cycle 704 includes a period 706 during which the GO transmits PRSs using each beam available to the GO (e.g., each beam of the GO that is directed to another member of the group). The first PRS cycle 704 also includes a period 710 during which the four members transmit PRSs using two beams each. The first member transmits two PRSs during the period 712. Similarly, the second member transmits two PRSs during the period 714, the third member transmits two PRSs during the period 716, and the fourth member transmits two PRSs during the period 718. After a cycle gap 720 that may be, for example, 200 ms (FIG. 7 not to scale), a second PRS cycle 730 occurs. During the second PRS cycle, the GO transmits PRSs using each beam available to the GO during the period 732.). During a period 740 in the second PRS cycle, the four members again transmit PRSs using two beams each. The first member transmits two PRSs during the period 742. Similarly, the second member transmits two PRSs during the period 744, the third member transmits two PRSs during the period 746, and the fourth member transmits two PRSs during the period 748.

According to aspects of the present disclosure, in some cases, k may be 1, so that the positioning non-anchors transmit PRSs using only one beam out of all of their beam options.

In aspects of the present disclosure, positioning non-anchors may determine a beam pattern to use in transmitting PRS based on an angle of arrival of a PRS(s) from the group owner. For example, a positioning non-anchor may measure an angle of arrival of a PRS from a group owner then transmit a PRS using a beam pattern aligned with that angle of arrival.

According to aspects of the present disclosure, a positioning non-anchor may measure an angle of arrival of a PRS from a GO and then transmit PRS using the k beam patterns that are most closely-aligned with that angle of arrival.

In aspects of the present disclosure, a positioning non-anchor may transmit a PRS as described above and not transmit an identifier (e.g., an index) of the beam used in transmitting the PRS. It may be noted that as long as only k beams will be utilized, the positioning can be completed without the GO being informed which beam the positioning non-anchor(s) use for transmitting PRS(s).

According to aspects of the present disclosure, a positioning non-anchor may transmit a PRS and an identifier (e.g., an index) of the beam used in transmitting the PRS. Indicating the chosen beam index to the GO may enable the GO to determine the length of the COT accordingly (e.g., by determining how PRS(s) positioning non-anchors will transmit).

In aspects of the present disclosure, a positioning non-anchor may indicate a number of beams less than or equal to k that the positioning non-anchor will transmit in before transmitting those PRS(s). The positioning non-anchor may indicate the number of beams in an ITS message, for example.

Figure 8:
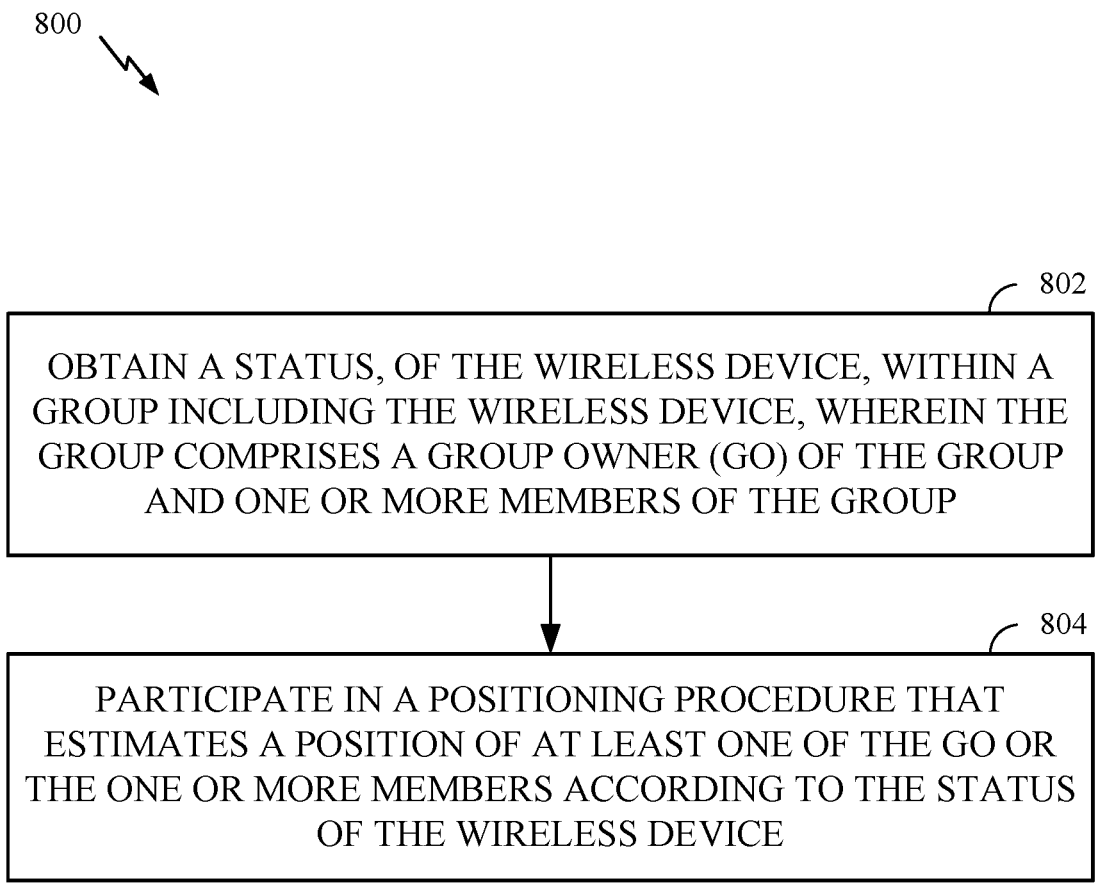
FIG. 8 is a flow diagram illustrating example operations for wireless communication by a wireless device, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., the UE 120a in the wireless communication network 100). The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin, at block 802, by obtaining a status, of the wireless device, within a group including the wireless device, wherein the group comprises a group owner (GO) of the group and one or more members of the group. For example, UE 120a (shown in FIGS. 1-2) obtains (e.g., receives a signal indicating) a status (e.g., non-anchor member), of the UE, within a group including the UE, wherein the group comprises a group owner (GO, e.g., BS 110a, shown in FIGS. 1-2) of the group and one or more members of the group.

At block 804, operations 800 may continue by participating in a positioning procedure that estimates a position of at least one of the GO or the one or more members according to the status of the wireless device. Continuing the example from above, the UE 120a participates in a positioning procedure that estimates a position of at least one of the GO or the one or more members according to the status of the wireless device, e.g., transmits k PRSs (because the UE is a non-anchor member) on beams aligned with an angle of arrival of a PRS from the GO (because the UE is a non-anchor member).

Figure 9:
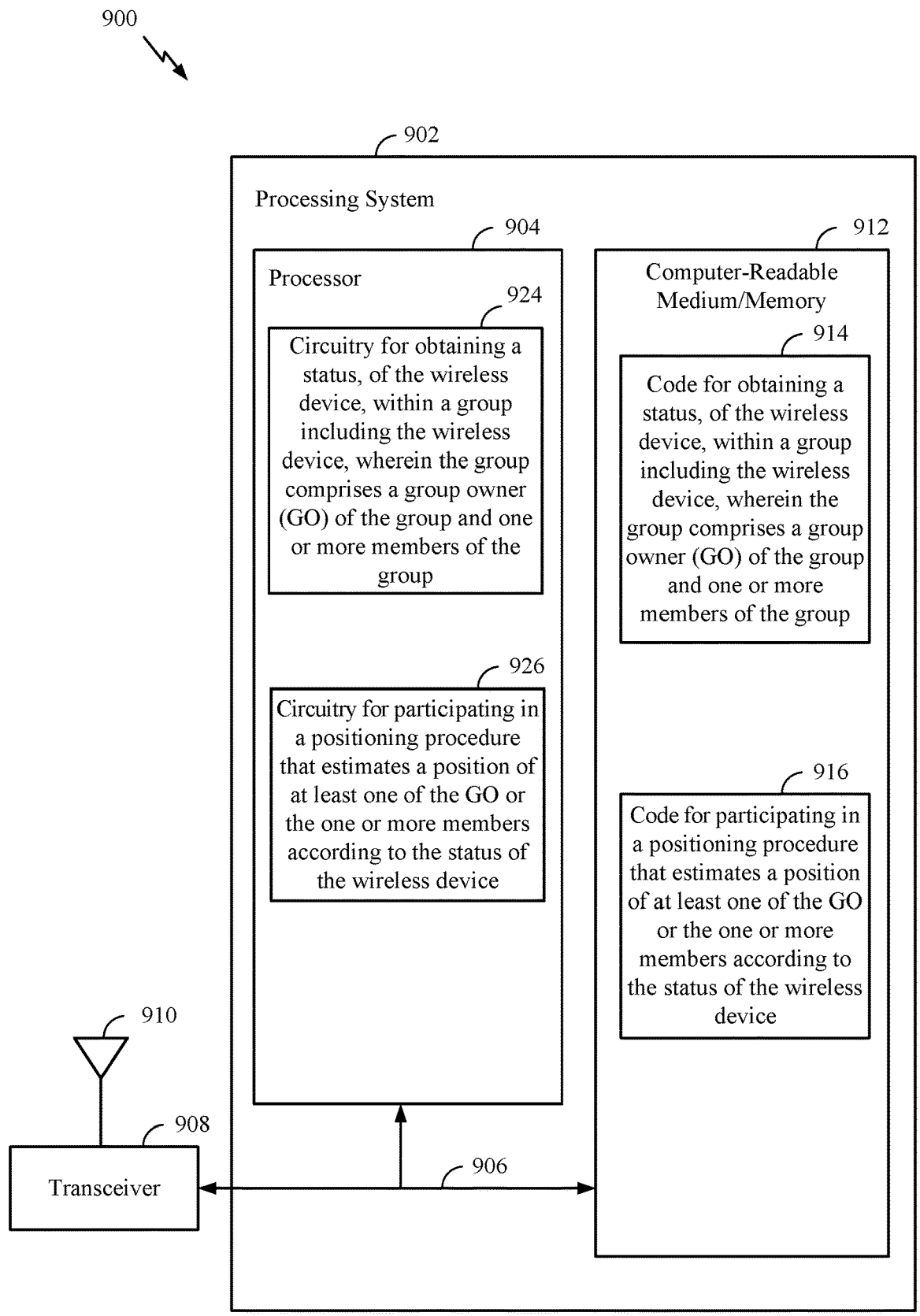
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 8. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 8, or other operations for performing the various techniques discussed herein for grouping devices to improve latency in round trip time (RTT) based millimeter wave (mmWave) positioning. In certain aspects, computer-readable medium/memory 912 stores code 914 for obtaining a status, of the wireless device, within a group including the wireless device, wherein the group comprises a group owner (GO) of the group and one or more members of the group; and code 916 for participating in a positioning procedure that estimates a position of at least one of the GO or the one or more members according to the status of the wireless device. In certain aspects, the processor 904 has circuitry configured to implement the code stored in the computer-readable medium/memory 912. The processor 904 includes circuitry 924 for obtaining a status, of the wireless device, within a group including the wireless device, wherein the group comprises a group owner (GO) of the group and one or more members of the group; and circuitry 926 for participating in a positioning procedure that estimates a position of at least one of the GO or the one or more members according to the status of the wireless device.

Example Aspects

Aspect 1: A method of wireless communication by a wireless device, comprising: obtaining a status, of the wireless device, within a group including the wireless device, wherein the group comprises a group owner (GO) of the group and one or more members of the group; and participating in a positioning procedure that estimates a position of at least one of the GO or the one or more members according to the status of the wireless device.

Aspect 2: The method of Aspect 1, wherein obtaining the status comprises determining that the wireless device is an anchor group member and wherein participating in the positioning procedure comprises transmitting a first positioning reference signal (PRS) on each first beam available to the wireless device.

Aspect 3: The method of Aspect 2, wherein the first beams available to the wireless device comprise at least one first beam corresponding to each member of the group other than the wireless device.

Aspect 4: The method of Aspect 2, wherein the wireless device comprises the GO of the group.

Aspect 5: The method of Aspect 4, wherein participating in the positioning procedure comprises: receiving an indication of a second beam from another member of the group; and receiving a second PRS from the other member via the second beam.

Aspect 6: The method of one of Aspects 1-5, wherein the wireless device comprises the GO of the group and the method further comprises: determining a length of a channel occupancy time (COT) for transmission of positioning reference signals (PRSs) of the positioning procedure, based on a number of members of the group and a number of beams used for the transmission of the PRSs; and transmitting an indication of the length of the COT.

Aspect 7: The method of Aspect 6, wherein the length of the COT is based on a first number of anchor members of the group multiplied by a second number of first beams available to each of the anchor members plus a third number of non-anchor members of the group multiplied by a fourth number of second beams used for the transmission of the PRSs by the non-anchor members.

Aspect 8: The method of Aspect 7, further comprising: transmitting an indication of the fourth number to the non-anchor members of the group.

Aspect 9: The method of one of Aspects 1-8, wherein obtaining the status comprises determining that the wireless device is a non-anchor group member and wherein participating in the positioning procedure comprises: determining a direction of the GO from the wireless device based on a first positioning reference signal (PRS) received from the GO; and transmitting one or more second PRSs on one or more beams aligned with the direction of the GO from the wireless device.

Aspect 10: The method of Aspect 9, further comprising: receiving, from the GO, an indication of the number of the one or more beams.

Aspect 11: The method of one of Aspects 1-10, wherein obtaining the status comprises: receiving an intelligent transportation system (ITS) message indicating the status.

Aspect 12: The method of one of Aspects 1-11, wherein the wireless device comprises the GO, and the method further comprises: transmitting an intelligent transportation system (ITS) message indicating another status of another member of the group.

Aspect 13: An apparatus for wireless communications, comprising: at least one processor configured to: obtain a status, of the apparatus, within a group including the apparatus, wherein the group comprises a group owner (GO) of the group and one or more members of the group; and participate in a positioning procedure that estimates a position of at least one of the GO or the one or more members according to the status of the apparatus; and a memory coupled with the at least one processor.

Aspect 14: The apparatus of Aspect 13, wherein the processor is configured to obtain the status by determining that the apparatus is an anchor group member and wherein participating in the positioning procedure comprises transmitting a first positioning reference signal (PRS) on each first beam available to the apparatus.

Aspect 15: The apparatus of Aspect 14, wherein the first beams available to the apparatus comprise at least one first beam corresponding to each member of the group other than the apparatus.

Aspect 16: The apparatus of Aspect 14, wherein the apparatus comprises the GO of the group.

Aspect 17: The apparatus of Aspect 16, wherein the processor is configured to participate in the positioning procedure by: receiving an indication of a second beam from another member of the group; and receiving a second PRS from the other member via the second beam.

Aspect 18: The apparatus of one of Aspects 13-17, wherein the apparatus comprises the GO of the group and the processor is further configured to: determine a length of a channel occupancy time (COT) for transmission of positioning reference signals (PRSs) of the positioning procedure, based on a number of members of the group and a number of beams used for the transmission of the PRSs; and transmit an indication of the length of the COT.

Aspect 19: The apparatus of Aspect 18, wherein the processor is configured to determine the length of the COT based on a first number of anchor members of the group multiplied by a second number of first beams available to each of the anchor members plus a third number of non-anchor members of the group multiplied by a fourth number of second beams used for the transmission of the PRSs by the non-anchor members.

Aspect 20: The apparatus of Aspect 19, wherein the processor is further configured to: transmit an indication of the fourth number to the non-anchor members of the group.

Aspect: 21: The apparatus of one of Aspects 13-20, wherein the processor is configured to obtain the status by determining that the apparatus is a non-anchor group member, and wherein the processor is configured to participate in the positioning procedure by: determining a direction of the GO from the apparatus based on a first positioning reference signal (PRS) received from the GO; and transmitting one or more second PRSs on one or more beams aligned with the direction of the GO from the apparatus.

Aspect 22: The apparatus of Aspect 21, wherein the processor if further configured to: receive, from the GO, an indication of the number of the one or more beams.

Aspect 23: The apparatus of one of Aspects 13-22, wherein the processor is configured to obtain the status by: receiving an intelligent transportation system (ITS) message indicating the status.

Aspect 24: The apparatus of one of Aspects 13-23, wherein the apparatus comprises the GO, and the processor is further configured to: transmit an intelligent transportation system (ITS) message indicating another status of another member of the group.

Aspect 25: An apparatus for wireless communication, comprising: means for obtaining a status, of the apparatus, within a group including the apparatus, wherein the group comprises a group owner (GO) of the group and one or more members of the group; and means for participating in a positioning procedure that estimates a position of at least one of the GO or the one or more members according to the status of the apparatus.

Aspect 26: A computer-readable medium including instructions that, when executed by a processing system in a wireless device, cause the processing system to perform operations including: obtaining a status, of the wireless device, within a group including the wireless device, wherein the group comprises a group owner (GO) of the group and one or more members of the group; and participating in a positioning procedure that estimates a position of at least one of the GO or the one or more members according to the status of the wireless device.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a wireless device, comprising:
obtaining an anchor status, of the wireless device, within a group including the wireless device, wherein the group comprises a group owner (GO) of the group and one or more members of the group; and
participating in a positioning procedure that estimates a position of at least one of the GO or the one or more members according to the anchor status of the wireless device.

2. The method of claim 1, wherein obtaining the anchor status comprises determining that the wireless device is an anchor group member and wherein participating in the positioning procedure comprises transmitting a first positioning reference signal (PRS) on each first beam available to the wireless device.

3. The method of claim 2, wherein the first beams available to the wireless device comprise at least one first beam corresponding to each member of the group other than the wireless device.

4. The method of claim 2, wherein the wireless device comprises the GO of the group.

5. The method of claim 4, wherein participating in the positioning procedure comprises:
receiving an indication of a second beam from another member of the group; and
receiving a second PRS from the other member via the second beam.

6. The method of claim 1, wherein the wireless device comprises the GO of the group and the method further comprises:
determining a length of a channel occupancy time (COT) for transmission of positioning reference signals (PRSs) of the positioning procedure, based on a number of members of the group and a number of beams used for the transmission of the PRSs; and
transmitting an indication of the length of the COT.

7. The method of claim 6, wherein the length of the COT is based on a first number of anchor members of the group multiplied by a second number of first beams available to each of the anchor members plus a third number of non-anchor members of the group multiplied by a fourth number of second beams used for the transmission of the PRSs by the non-anchor members.

8. The method of claim 7, further comprising:
transmitting an indication of the fourth number to the non-anchor members of the group.

9. The method of claim 1, wherein obtaining the anchor status comprises determining that the wireless device is a non-anchor group member and wherein participating in the positioning procedure comprises:
determining a direction of the GO from the wireless device based on a first positioning reference signal (PRS) received from the GO; and
transmitting one or more second PRSs on one or more beams aligned with the direction of the GO from the wireless device.

10. The method of claim 9, further comprising:
receiving, from the GO, an indication of a number of the one or more beams.

11. The method of claim 1, wherein obtaining the anchor status comprises:
receiving an intelligent transportation system (ITS) message indicating the anchor status.

12. The method of claim 1, wherein the wireless device comprises the GO, and the method further comprises:
transmitting an intelligent transportation system (ITS) message indicating another anchor status of another member of the group.

13. An apparatus for wireless communications, comprising:
- a memory;
- a transceiver; and
- at least one processor, communicatively coupled to the memory and the transceiver, the at least one processor configured to:
- obtain an anchor status, of the apparatus, within a group including the apparatus, wherein the group comprises a group owner (GO) of the group and one or more members of the group; and
- participate in a positioning procedure that estimates a position of at least one of the GO or the one or more members according to the anchor status of the apparatus.

14. The apparatus of claim 13, wherein the processor configured to obtain the anchor status comprises the processor configured to obtain the anchor status by determining that the apparatus is an anchor group member and wherein participating in the positioning procedure comprises transmitting a first positioning reference signal (PRS) on each first beam available to the apparatus.

15. The apparatus of claim 14, wherein the first beams available to the apparatus comprise at least one first beam corresponding to each member of the group other than the apparatus.

16. The apparatus of claim 14, wherein the apparatus comprises the GO of the group.

17. The apparatus of claim 16, wherein the processor configured to participate in the positioning procedure comprises the processor configured to:
- receive an indication of a second beam from another member of the group; and
- receive a second PRS from the other member via the second beam.

18. The apparatus of claim 13, wherein the apparatus comprises the GO of the group and the processor is further configured to:
- determine a length of a channel occupancy time (COT) for transmission of positioning reference signals (PRSs) of the positioning procedure, based on a number of members of the group and a number of beams used for the transmission of the PRSs; and
- transmit an indication of the length of the COT.

19. The apparatus of claim 18, wherein the processor configured to determine the length of the COT comprises the processor configured to determine the length of the COT based on a first number of anchor members of the group multiplied by a second number of first beams available to each of the anchor members plus a third number of non-anchor members of the group multiplied by a fourth number of second beams used for the transmission of the PRSs by the non-anchor members.

20. The apparatus of claim 19, wherein the processor is further configured to:
- transmit an indication of the fourth number to the non-anchor members of the group.

21. The apparatus of claim 13, wherein the processor configured to obtain the anchor status comprises the processor configured to determine that the apparatus is a non-anchor group member, and wherein the processor configured to participate in the positioning procedure comprises the processor configured to:
- determine a direction of the GO from the apparatus based on a first positioning reference signal (PRS) received from the GO; and
- transmit one or more second PRSs on one or more beams aligned with the direction of the GO from the apparatus.

22. The apparatus of claim 21, wherein the processor is further configured to:
- receive, from the GO, an indication of a number of the one or more beams.

23. The apparatus of claim 13, wherein the processor configured to obtain the anchor status comprises the processor configured to:
- receive an intelligent transportation system (ITS) message indicating the anchor status.

24. The apparatus of claim 13, wherein the apparatus comprises the GO, and the processor is further configured to:
- transmit an intelligent transportation system (ITS) message indicating another anchor status of another member of the group.

25. An apparatus for wireless communication, comprising:
- means for obtaining an anchor status, of the apparatus, within a group including the apparatus, wherein the group comprises a group owner (GO) of the group and one or more members of the group; and
- means for participating in a positioning procedure that estimates a position of at least one of the GO or the one or more members according to the anchor status of the apparatus.

26. A non-transitory computer-readable medium for wireless communications including instructions that, when executed by a processing system in a wireless device, cause the processing system to perform operations including:
- obtaining an anchor status, of the wireless device, within a group including the wireless device, wherein the group comprises a group owner (GO) of the group and one or more members of the group; and
- participating in a positioning procedure that estimates a position of at least one of the GO or the one or more members according to the anchor status of the wireless device.

* * * * *